United States Patent
Jin et al.

(10) Patent No.: US 9,860,684 B2
(45) Date of Patent: Jan. 2, 2018

(54) DUAL-MODE DEVICE AND METHOD FOR ACHIEVING THE SIMULTANEOUS COMMUNICATION THEREIN

(71) Applicant: Telink Semiconductor (Shanghai) Co., LTD., Shanghai (CN)

(72) Inventors: Haipeng Jin, Shanghai (CN); Mingjian Zheng, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/089,754

(22) Filed: Apr. 4, 2016

(65) Prior Publication Data

US 2017/0188181 A1   Jun. 29, 2017

(30) Foreign Application Priority Data

Dec. 25, 2015  (CN) .......................... 2015 1 0996787

(51) Int. Cl.
  *H04B 7/00*   (2006.01)
  *H04W 4/00*   (2009.01)
  *H04W 76/02*  (2009.01)
  *H04W 88/06*  (2009.01)

(52) U.S. Cl.
  CPC ......... *H04W 4/008* (2013.01); *H04W 76/023* (2013.01); *H04W 88/06* (2013.01)

(58) Field of Classification Search
  CPC ....... H04W 4/008; H04W 4/026; H04W 4/16; H04W 68/00; H04W 68/12; H04W 84/04; H04W 84/12
  USPC ........................................................ 455/41.2
  See application file for complete search history.

(56) References Cited

U.S. PATENT DOCUMENTS

| | | | | |
|---|---|---|---|---|
| 2007/0019672 A1* | 1/2007 | Guthrie | ................. | H04W 88/06 370/466 |
| 2016/0056669 A1* | 2/2016 | Bell | .......................... | G06F 1/26 700/286 |

\* cited by examiner

*Primary Examiner* — Ajibola Akinyemi
(74) *Attorney, Agent, or Firm* — Nixon & Vanderhye P.C.

(57) ABSTRACT

The present disclosure relates to the electronic communication field and discloses a dual-Mode device and a method for achieving the simultaneous communication therein. The dual-mode device has a dual-mode protocol stack scheduling mechanism and uniformly schedules the transmission event of the Bluetooth protocol stack and the ZigBee protocol stack. The method comprising the following steps: after matching the dual-mode device with a Bluetooth host as a slave and the ZigBee target device as a control device, the dual-mode device conducting the Bluetooth connection maintenance according to preset interval and processing the information exchange with the ZigBee target device at each Bluetooth connection interval. Compared to the prior art, the present disclosure allows the smart devices to support two types of communication protocols, achieves the interaction between the smart devices using the two different wireless standards, and greatly improves the communication efficiency of network with the Bluetooth and ZigBee devices.

5 Claims, 6 Drawing Sheets

DUAL-MODE DEVICE AND METHOD FOR ACHIEVING THE SIMULTANEOUS COMMUNICATION THEREIN

TECHNICAL FIELD

The present disclosure generally relates to the electronics and communication field, and particularly relates to a dual-Mode device and a method for achieving the simultaneous communication therein.

BACKGROUND

Smart Home, using the residence as its platform, utilizes the generic cabling technology, network communications technology, security technology, automatic control technology and audio-video technology to integrate the home life-related facilities so as to construct the high-efficiency residential facilities and a management system for the family matters, improve home safety, convenience, comfortableness and artistry, and achieve an environment protection and energy-saving living environment.

The current names for Smart Home are many and varied, for example, Electronic Home (e-Home), Digital family, Home Automation, Home net/Networks for Home, Network Home, Intelligent home, etc. Although the names are different, their meanings and desired functions are basically the same.

Smart Home is defined as a system utilizing computer, network and generic cabling technologies to integrate various home life-related subsystems through the family information management platform. First of all, building a communication network at the home, providing the necessary channels for the family information, under the control of the family network operating system, the control and monitoring of all home appliances and facilities on the family network can be realized through the corresponding hardware and executive mechanisms. Secondly, they all form communication channels with the outside through a media in order to communicate information with the outside world (except for the home) and satisfy the need for the remote control/monitoring and information exchange. Lastly, their final goal is to satisfy people's need for safety, comfortableness, convenience and green environmental protection.

With the development of communication technology, when the wired Smart Home is forced out of the market due to intricate cabling, difficulty to promote and excessive cost, the wireless transmission technology becomes the best choice for the new generation Smart Home due to no need for cabling and easy installation. However Smart Home products on the current market have formed a coordinate situation for the multiple communication technologies (e.g. Bluetooth, WiFi, and ZigBee) due to the merits of different transmission technology. Consequently, the different wireless standards result in the low interoperability between Smart Home products from different manufacturers so as to severely limit the promotion and application of Smart Home.

SUMMARY

The objects of the present disclosure are to provide a dual-mode device and a method for achieving the simultaneous communication therein such that the smart devices can support two kinds of communication protocol so as to achieve the interaction between the smart devices using the two different wireless standards and greatly improve the communication efficiency of network with the Bluetooth and ZigBee devices.

In order to solve the above-mentioned technical problems, an embodiment of the present invention proposed a method for achieving the simultaneous communication in a dual-mode device, comprising the following steps: the dual-mode device having a dual-mode protocol stack scheduling mechanism and uniformly scheduling the transmission event of the Bluetooth protocol stack and the ZigBee protocol stack. The method further comprising the following steps: after matching the dual-mode device with a Bluetooth host as a slave device and a ZigBee target device as a control device, the dual-mode device conducting the Bluetooth maintenance connection according to the preset interval, and processing information exchange with the ZigBee target device at each Bluetooth connection interval, wherein the dual-mode device periodically exchanges data with Bluetooth host device during the Bluetooth low power consumption connection maintenance period so as to flexibly schedule timing for receiving and sending the ZigBee data.

The embodiment of the present invention also provides a dual-mode device, comprising: a dual-mode scheduling module, a Bluetooth protocol stack, a ZigBee protocol stack, a matching module and a communication module, wherein the dual-mode scheduling module is used to uniformly schedule the transmission event of a Bluetooth protocol stack and a ZigBee protocol stack, and the matching module is used to match with Bluetooth host and ZigBee target device. After matching the matching module with the Bluetooth host and the ZigBee target device, the communication module is used for conducting the Bluetooth maintenance connection on basis of the scheduling of the dual-mode scheduling module and the preset interval and processing the information exchange with the ZigBee target device at each Bluetooth connection interval, wherein the dual-mode scheduling module controls the periodical exchange data between the communication module and the Bluetooth host during the Bluetooth low power consumption connection maintenance period so as to flexibly schedule timing for receiving and sending ZigBee data.

Compared to the prior art, the embodiment of the present invention uniformly schedules the Bluetooth protocol stack and the ZigBee protocol stack through the dual devices on basis of the transmission event. After matching the dual-mode device with the Bluetooth host and the ZigBee target device, respectively, the dual-mode device conducts the Bluetooth maintenance connection according to preset interval, and processes the information exchange with the ZigBee target device at each Bluetooth connection interval, i.e., the dual-mode device periodically exchanges data with the Bluetooth host device during the Bluetooth low power consumption connection maintenance period so as to flexibly schedule timing for receiving and sending the ZigBee data. Thus, the present disclosure simultaneously executes the transmission of ZigBee data in the case of ensuring almost no interruption of the Bluetooth communication connection, which greatly improves the communication efficiency of network with the Bluetooth and ZigBee devices.

In one exemplary embodiment, the dual-mode device, in the step of sending data to or receiving data from ZigBee target device at each Bluetooth connection interval, receives the request for sending or receiving the ZigBee data from application layer. After receiving the request for sending or receiving ZigBee data from application layer, it comprises the following steps: starting the ZigBee transmission immediately if the dual-mode device determines that there is enough time to complete ZigBee transmission; starting the ZigBee transmission after the next Bluetooth maintenance connection if the dual-mode device determines that there is no enough time to complete ZigBee transmission before the next Bluetooth maintenance connection. Thus, the dual-mode device uniformly schedules the ZigBee transmission event based on the initiation time and the transmission time requirement of the ZigBee transmission event and immediately executes the ZigBee transmission event at the current Bluetooth connection interval in the case of the allowance of the time point and duration. Otherwise, the ZigBee transmission event is delayed to the next Bluetooth connection interval so as to avoid affecting the Bluetooth transmission event and ensure the robustness of the Bluetooth connection.

In one exemplary embodiment, the dual-mode device has a Bluetooth slave latency mechanism; wherein the Bluetooth slave latency time is extended if the data of the ZigBee interaction data are the above preset threshold and it is required to maintain the Bluetooth low power consumption connection at the same time. The dual-mode device can flexibly extend Bluetooth slave latency time according to the time duration requirement of the ZigBee data interaction so as to ensure the sequence execution of the Bluetooth and ZigBee transmission events because the dual-mode device has the Bluetooth slave latency mechanism.

The above simplified summary of example embodiments serves to provide a basic understanding of the present invention. This summary is not an extensive overview of all contemplated embodiments, and is intended to neither identify key or critical elements of all embodiments nor delineate the scope of any or all embodiments of the present invention. Its sole purpose is to present one or more embodiments in a simplified form as a prelude to the more detailed description of the disclosure that follows. To the accomplishment of the foregoing, the one or more embodiments of the present invention include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
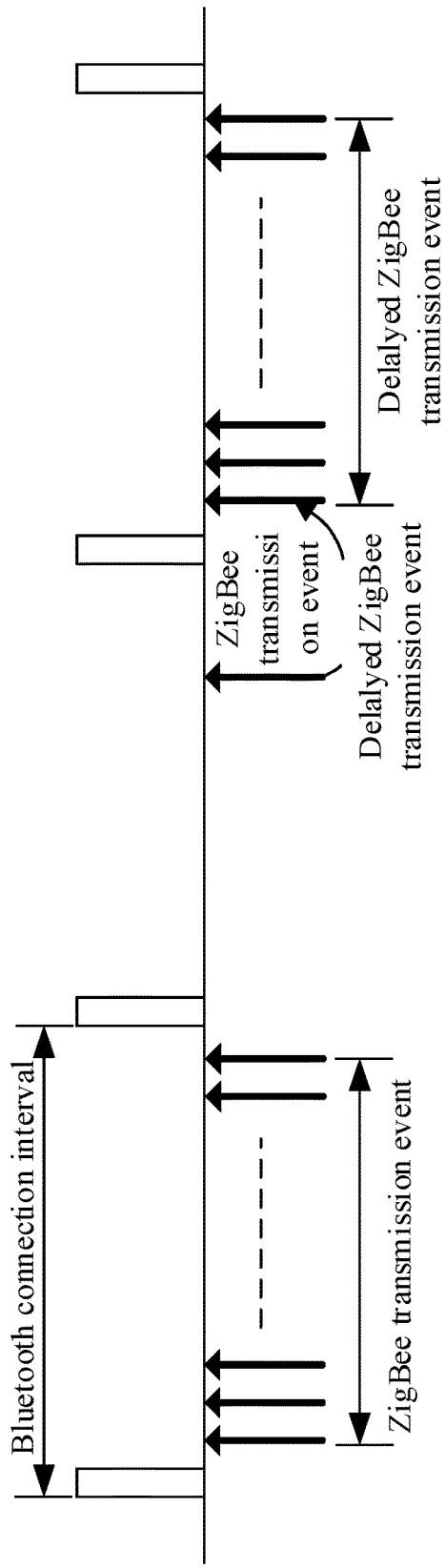
FIG. 1 is a transmission sequence diagram of a BLE (Bluetooth Low Energy) device and a ZigBee device implementing the simultaneous communication method in the dual-mode device according to the first embodiment of the present disclosure.

For the clarity of the objects, technical solutions and advantages of the present invention, the details of the various embodiments of the present invention will be illustrated in the following specification together with the drawings. However, it will be apparent to those of ordinary skill in the art that many technical details are proposed in various embodiments of the present invention for the purpose of better understanding of the present application. However, even without these technical details and various changes and modifications based on the following embodiments, the claimed technical solution may still be accomplished.

The first embodiment of the present disclosure relates to a method for achieving the simultaneous communication in a dual-mode device. The dual-mode device has a dual-mode protocol stack scheduling mechanism and uniformly schedules the transmission event of a Bluetooth protocol stack and a ZigBee protocol stack. In particular, an arbitration layer (stack scheduling module) is added to the dual-mode device for coordinating the status between the two stacks so as to meet the strict periodical requirement of BLE (Bluetooth low energy) link and ensure the high-efficiency utilization of ZigBee/RF4CE.

The BLE connection requires a strict maintenance mechanism. A slave monitors a host at each connection interval. The ZigBee's sequence requirement is relatively loose. Therefore, the periodical adjustment is mainly carried out about the BLE connection interval, in particular, the BLE timing connection point. The ZigBee transmission is processed between the BLE timing connection points.

The method for achieving the simultaneous communication in a dual-mode device comprises the following steps:

the dual-mode device conducting the Bluetooth connection maintenance according to a preset interval and processing the information exchange with the ZigBee target device at each Bluetooth connection interval after matching the dual-mode device with the Bluetooth host as slave and with the ZigBee target device as a control device, wherein the dual-mode device periodically exchanges data with the Bluetooth host during the Bluetooth low power consumption connection maintenance period so as to flexibly schedule timing for receiving and sending the ZigBee data. The Bluetooth connection interval means the idle gap between every two adjacent Bluetooth communication gaps during the Bluetooth low power consumption connection maintenance period. The present embodiment can artfully utilize the idle gap to execute the ZigBee transmission event so as to realize a simultaneous communication method of a Bluetooth and a ZigBee device in the dual-mode device. Moreover, the Bluetooth operation is not affected because the ZigBee transmission event is executed at the connection intervals of the Bluetooth connection. Therefore, the embodiment of the present disclosure effectively improves the communication efficiency of network with the dual-mode communication device.

The following will particularly illustrate the details on how the dual-mode device uniformly schedules the ZigBee transmission event that appears suddenly. FIG. 1 shows the two ZigBee transmission sequences. In the first scenario, the ZigBee transmission event occurs at the first half part of BLE connection interval, and the ZigBee transmission sequence can be initiated immediately and executed completely if the arbitration layer of the dual-mode device determines that there is enough time to complete the ZigBee transmission sequence. In the second scenario, the ZigBee transmission event occurs at the second half part of the BLE connection interval, and the arbitration layer notifies the ZigBee transmission event to stand in a queue if the arbitration layer determines that there is no enough time to complete the ZigBee transmission event before the next Bluetooth transmission gap time node so as to allow the transmission event to be transmitted during the next BLE connection interval.

Figure 2:
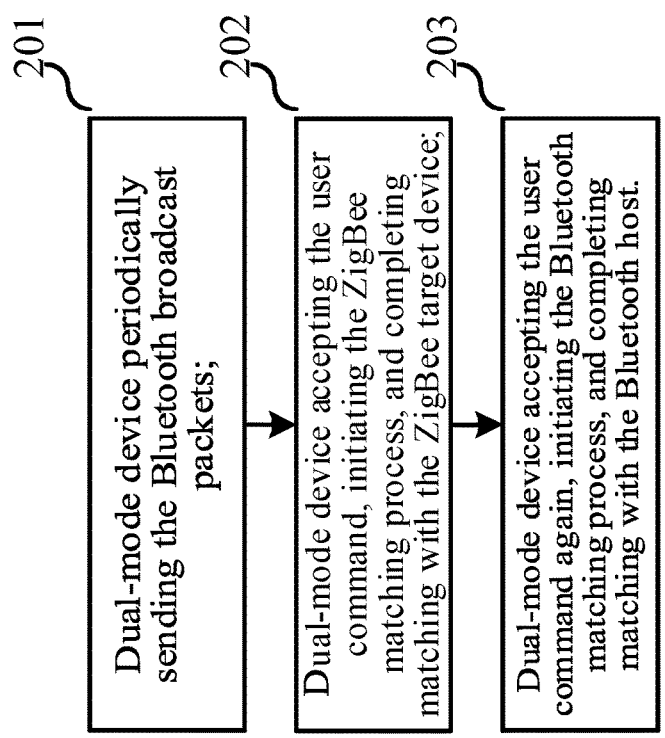
FIG. 2 is a matching flow diagram of a BLE device and a ZigBee device implementing the simultaneous communication method in the dual-mode device according to the first embodiment of the present disclosure.
Figure 3:
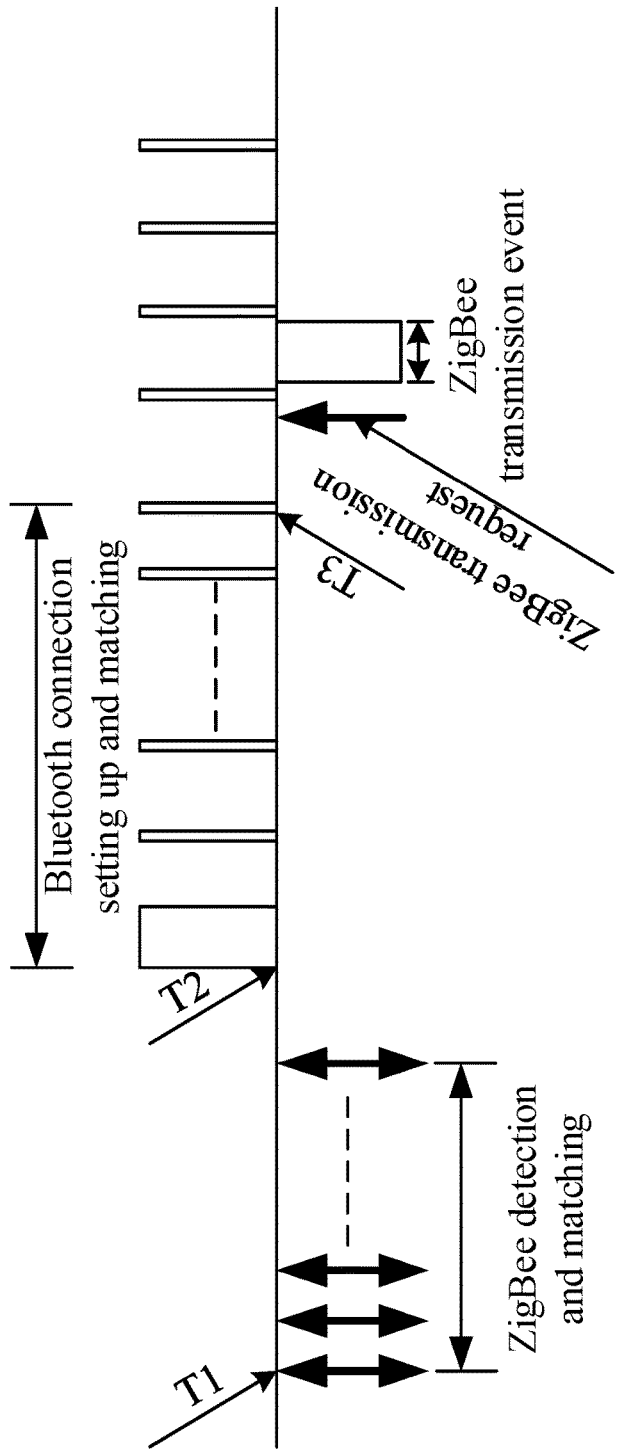
FIG. 3 is a matching sequence diagram of a BLE device and a ZigBee device implementing the simultaneous communication method in the dual-mode device according to the first embodiment of the present disclosure.

During the process of matching the dual-mode device of the present embodiment as a slave to the Bluetooth host and the ZigBee target device, as shown in FIG. 2, it comprises the following steps 201-203:

Step 201: the Dual-mode device periodically sending the Bluetooth broadcast packets. In particular, as shown in FIG. 3, at the time T1, the dual-mode device is in an idle state, and it does not match to any BLE or ZigBee device. The dual-mode device of the present embodiment periodically sends Bluetooth broadcast packet. It should be pointed out that, with the design variation of the application layer, the dual-mode device may also not send broadcast packets. The present embodiment does not make specific limitations on whether or not to send Bluetooth broadcast packets through the dual-mode device when matching.

Step 202: the Dual-mode device accepts the user command, initiates the ZigBee matching process, and completes matching with the ZigBee target device. The User initiates the ZigBee matching process at the time T1, and the dual-mode device completes matching with a ZigBee device.

Step 203: the Dual-mode device accepts a user command again, initiates the Bluetooth matching process, and completes matching with the Bluetooth host. At the time T2, the user initiates the match between the dual-mode device and a BLE device again. It should be pointed out that the dual-mode device has completed matching with the other ZigBee devices. At the time node of the time T2, the matching process of the newly added Bluetooth device can be completed during the BLE connection interval because there is no the ZigBee event or the ZigBee transmission to be scheduled. Then, at the time T3, the dual-mode device has completed matching with the newly added ZigBee device and the BLE device. After the time T3, the dual-mode device and the newly added Bluetooth device and the ZigBee device begin to follow the above-mentioned BLE connection interval and process any incoming ZigBee transmission events. It should be pointed out that, even if the BLE device and the ZigBee device are in the same network, the match manner between the BLE/ZigBee device and the dual-mode device is still the same as the prior art, and especially will not affect the match between the Bluetooth device and the dual-mode device in the present embodiment.

Compared to the prior art, in the present embodiment, the operating mode between the dual-mode device and the Bluetooth device is not affected after the Bluetooth host and the ZigBee target device complete matching with the dual-mode device respectively, whereas the ZigBee transmission events are uniformly scheduled by the arbitration layer added to the dual-mode device, even if the ZigBee transmission events always occur during the Bluetooth connection interval. When the ZigBee transmission event occurs, and the Bluetooth connection interval meets the time duration requirement of the ZigBee transmission event, the ZigBee transmission event is executed immediately. When the Bluetooth connection interval is not enough to complete the ZigBee transmission event, the ZigBee transmission event is delayed to the next Bluetooth connection interval so as to complete the ZigBee transmission event with high-efficiency, in the meantime avoid affecting the Bluetooth connection and ensure the robustness of the network.

The steps of the above-mentioned various methods are divided only to describe clearly. Some steps may be combined into one step or also be separated into multiple steps when implementing. As long as they comprise the same logical relation, they will fall into the protection scope of the present disclosure. Adding insignificant modifications or introducing of insignificant designs to an algorism or a procedure, without changing the core design of the algorism and procedure, still falls into the protection scope of the present disclosure.

Figure 4:
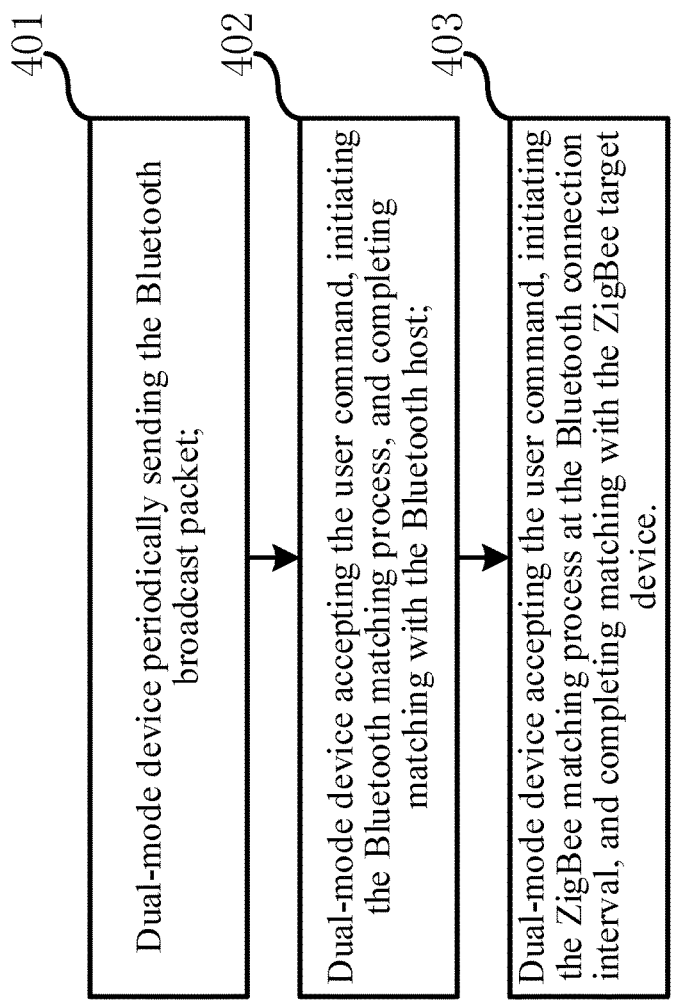
FIG. 4 is a matching flow diagram of a BLE device and a ZigBee device implementing the simultaneous communication method in the dual-mode device according to the second embodiment of the present disclosure.

The second embodiment of the present disclosure relates to a method for achieving the simultaneous communication in the dual-mode device. The second embodiment is approximately similar to the first one, and the major difference is in that, in the first embodiment, a ZigBee device completes matching with the dual-mode device ahead of the Bluetooth device. Whereas in the second embodiment, during the process of matching the dual-mode device to the Bluetooth host as a slave and to the ZigBee target device as a control device, as shown in FIG. 4, it comprises the steps 401-403:

Step 401: the Dual-mode device periodically sends the Bluetooth broadcast packets. Step 401 is identical with step 201 of the first embodiment and will not be described any more.

Step 402: the Dual-mode device accepts the user command, initiates the Bluetooth matching process, and completes matching with Bluetooth host.

Step 403: the Dual-mode device accepts the user command, initiates the ZigBee matching process at the Bluetooth connection interval, and completes matching with the ZigBee target device.

Figure 5:
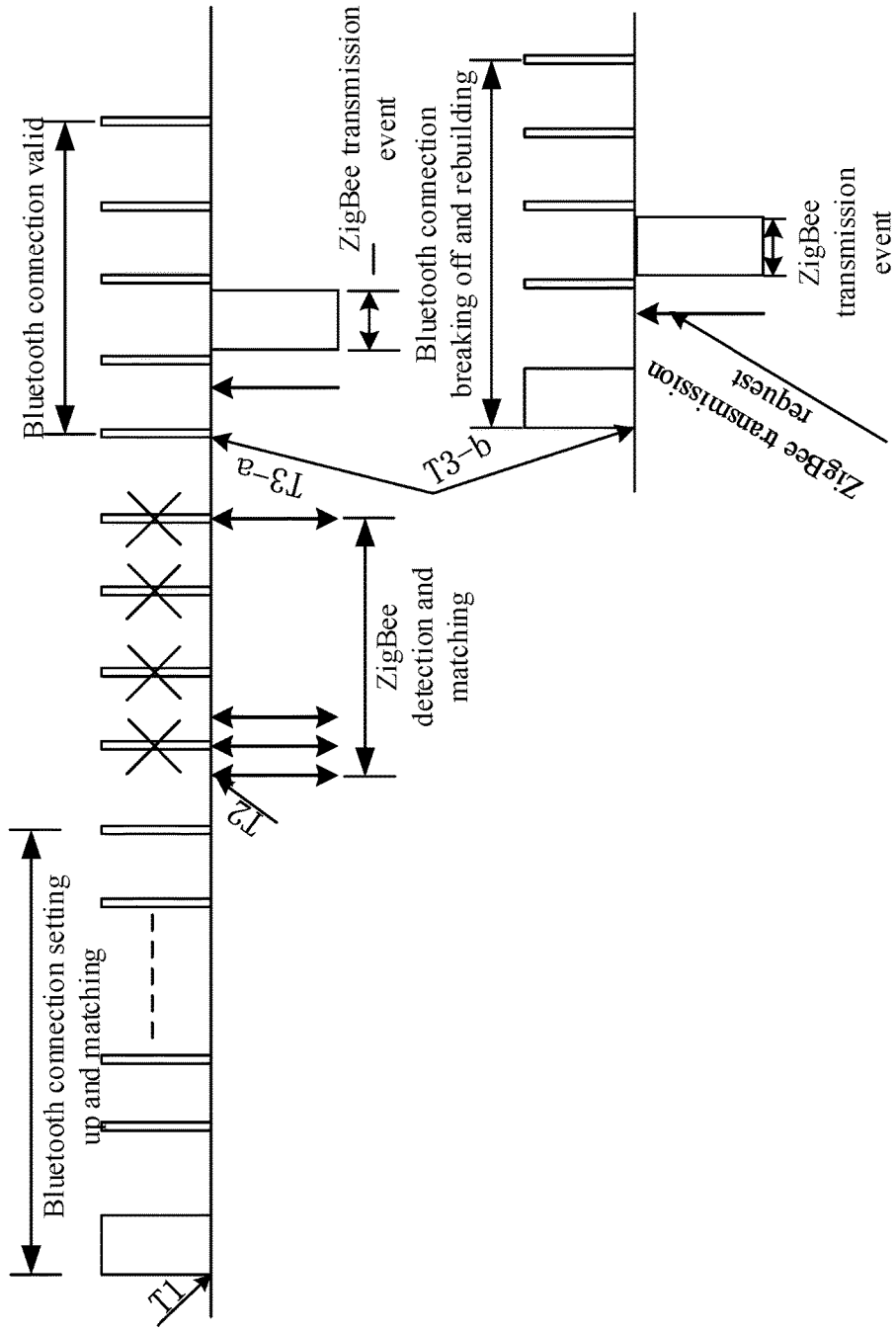
FIG. 5 is a matching sequence diagram of a BLE device and a ZigBee device implementing the simultaneous communication method in the dual-mode device according to the second embodiment of the present disclosure.

The sequence diagram of FIG. 5 illustrates the time sequence of matching the dual-mode device to the Bluetooth host and the ZigBee target device respectively. In the present embodiment, the dual-mode device does the BLE match firstly. At the time T1, the dual-mode device completes the BLE match and sets up the connection and periodically (i.e., the preset BLE connection interval, the connection interval may also be set according to the requirements) repeats the BLE connection interval. At the time T2, the user initiates the finding and matching process of the ZigBee match. Based on the BLE connection interval, the ZigBee match may span the multiple connection intervals as illustrated in FIG. 5. After the completion of the ZigBee match, there may be two results:

The first result: even if some connection intervals are lost, the BLE connection can still be maintained, as shown by the T3-a. Under such conditions, the dual-mode device switches to the BLE connection status as stated by the first embodiment.

The second result: the T3-b illustrates that the BLE connection with dual-mode device breaks off due to missing of the multiple connection events. At this point, the Bluetooth connection has to be reestablished (without needing to reestablish the Bluetooth matching). Then the Bluetooth connection recovers the normal timing, and the ZigBee transmission events disperse at the BLE connection intervals.

Therefore, any devices of the present invention can successfully match with the dual-mode device when introducing the new Bluetooth device or ZigBee device. Even if the Bluetooth connection breaks off due to the impact of the ZigBee device, the Bluetooth connection can automatically return to the normal connection status so as to ensure the reliability and stability of dual-mode device operation.

The third embodiment of the present disclosure relates to a method for achieving the simultaneous communication in the dual-mode device. The third embodiment has minor improvements over the first and second embodiments. The improvements mainly resides in that the ZigBee target device does not conduct the power saving operation with the Duty Cycle, i.e., the ZigBee target device always monitors the Bluetooth connection status instead of receiving data at fixed time. Thus, the ZigBee control device can flexibly choose data exchange time for the target device. It will not break off the Bluetooth connection when the ZigBee device detects that Bluetooth device is in the data transmission state. The ZigBee device will initiate and execute the ZigBee transmission event only when the Bluetooth device is detected that the Bluetooth devices are at the connection intervals so as to avoid the conflicts between the ZigBee transmission and the BLE transmission on the dual-mode ZigBee control devices. It is helpful for ensuring the smooth process of the ZigBee transmission event through monitoring the operation status of the Bluetooth devices by the ZigBee device so as to ensure the transmission reliability of the ZigBee transmission event.

The fourth embodiment of the present disclosure relates to a method for achieving the simultaneous communication in the dual-mode device. The fourth embodiment is slightly different from the third embodiment, and the major difference is in that, in the third embodiment, the ZigBee target devices do not conduct the power saving operation with the Duty Cycle. Whereas, in the fourth embodiment, the ZigBee device operates at the Duty Cycle mode, and the dual-mode device has a BLE slave latency mechanism. The BLE slave latency can be extended if the data of the ZigBee data interaction are above the preset threshold and in the meantime it is required that Bluetooth low power consumption connection is maintained, i.e., the ZigBee Duty Cycle is adjusted according to the set BLE connection interval, so that, even in the worst scenario, when the ZigBee transmission request occurs, the ZigBee Duty Cycle is either in the regular BLE connection interval, or in the BLE slave latency extension. In the present embodiment, the BLE slave latency is set as a bigger Bluetooth connection interval so as to keep enough time for the ZigBee interaction. Therefore, the present embodiment not only meets the power-saving requirement of the ZigBee device but also ensure the smooth process of the ZigBee transmission event so as to advantageously improve the reliability and stability of the ZigBee device operation.

Figure 6:
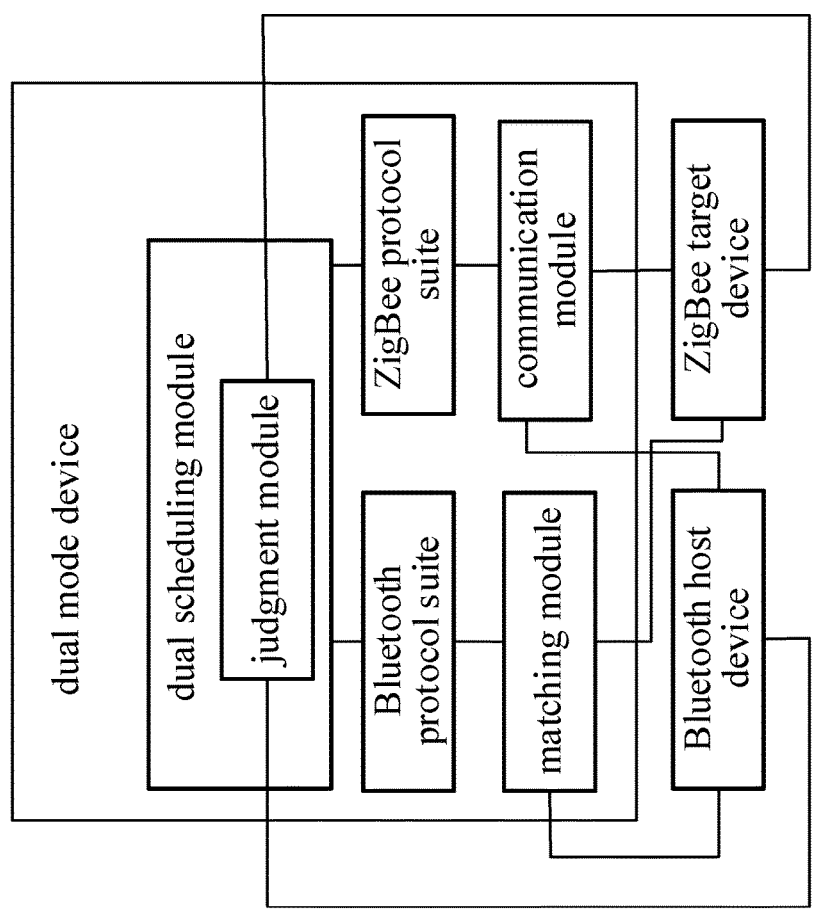
FIG. 6 is a structural diagram of the dual-mode device according to the fifth embodiment of the present disclosure.

The fifth embodiment of the present disclosure relates to a dual-mode device. The dual-mode device of the present embodiment can be, for example, a smartphone. However, the dual-mode device can also be an embedded SCM, a tablet PC, a laptop and the like. The present embodiment does not apply any limits to the specific type of the dual-mode device. As shown in FIG. 6, the dual-mode device comprises a dual-mode scheduling module, a Bluetooth protocol stack, a ZigBee protocol stack, a matching module and a communication module.

The dual-mode scheduling module is used to uniformly schedule the transmission event of the Bluetooth protocol stack and the ZigBee protocol stack. The matching module is used for the match between the Bluetooth host and the ZigBee target device. After the matching device completes matching with the Bluetooth host and the ZigBee target device, the communication module is used to conduct the Bluetooth connection maintenance based on the preset interval and the schedule of the dual scheduling module and monitor the connection request of ZigBee target device at each Bluetooth connection interval, wherein the periodical data exchange between the communication module and the Bluetooth host is controlled by the dual-mode scheduling module during the Bluetooth low power consumption connection maintenance period so as to flexibly schedule timing for receiving and sending the ZigBee data.

In particular, the dual-mode scheduling module comprises a decision module. After the communication module monitored the connection request of the ZigBee target device, the decision module determines whether or not there is enough time to complete the ZigBee transmission before the next Bluetooth maintenance connection, and triggers the communication module to initiate the ZigBee transmission immediately when determining that there is enough time to complete the ZigBee transmission, and triggers the communication module to initiate the ZigBee transmission after the next Bluetooth maintenance connection when determining that there is no enough time to complete the ZigBee transmission.

It is not difficult to find that the present embodiment is a systematic embodiment corresponding to the first embodiment. The present embodiment can be implemented through cooperating with the first embodiment. The related technical details mentioned in the first embodiment remains effective in the present embodiment and these will not be described any more so as to reduce the duplication. Correspondingly, the related technical details mentioned in the present embodiment can also be applied in the first embodiment.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various embodiments, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the embodiments are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the embodiments disclosed herein by way of illustration. Moreover, while embodiments and applications have been shown and described, it would be apparent to those skilled in the art having the benefit of this disclosure that many more modifications than mentioned above are possible without departing from the concepts disclosed herein.

The invention claimed is:

1. A method for achieving the simultaneous communication in a dual-mode device, wherein the dual-mode device has a dual-mode protocol stack scheduling mechanism and uniformly schedules transmission events of a Bluetooth protocol stack and a ZigBee protocol stack, the method comprising:
   the dual-mode device conducting Bluetooth connection maintenance according to a preset interval and processing information exchange with the ZigBee target device at each Bluetooth connection interval after the dual-mode device completes matching with a Bluetooth host as a slave and matching with a ZigBee target device as a control device,
   wherein the dual-mode device periodically exchanges data with the Bluetooth host device during the Bluetooth low power consumption connection maintenance period so as to flexibly schedule timing for receiving and sending the ZigBee data
   wherein the dual-mode device, in the step of sending data to or receiving data from the ZigBee target device at each Bluetooth connection interval, receives a request for sending or receiving the ZigBee data from an application layer;
   after receiving the request for sending or receiving the ZigBee data from the application layer, the method comprising:
   starting the ZigBee transmission immediately if the dual-mode device determines that there is enough time to complete the ZigBee transmission; and
   starting the ZigBee transmission after a next Bluetooth maintenance connection if the dual-mode device determines that there is no enough time to complete the ZigBee transmission before the next Bluetooth maintenance connection.

2. The method for achieving the simultaneous communication in the dual-mode device according to claim 1, wherein, during the process of the dual-mode device matching with the Bluetooth host as the slave and matching with the ZigBee target device as the control device, the method comprises following sub-steps:
   the dual-mode device periodically sending Bluetooth broadcast packets;
   the dual-mode device accepting a user command, initiating a ZigBee matching process, and completing matching with the ZigBee target device; and
   the dual-mode device accepting the user command again, initiating a Bluetooth matching process, and completing matching with the Bluetooth host.

3. The method for achieving the simultaneous communication in the dual-mode device according to claim 1, wherein, during the process of the dual-mode device matching with the Bluetooth host as the slave and matching with the ZigBee target device as the control device, the method comprises following sub-steps:
   the dual-mode device periodically sending Bluetooth broadcast packets;
   the dual-mode device accepting a user command, initiating a Bluetooth matching process, and completing matching with the Bluetooth host; and
   the dual-mode device accepting the user command again, initiating a ZigBee matching process at Bluetooth connection intervals and completing matching with the ZigBee target device.

4. The method for achieving the simultaneous communication in the dual-mode device according to claim 3, wherein, after the dual-mode device completes matching with the ZigBee target device, the connection with the Bluetooth host is recovered if the Bluetooth connection is lost.

5. A dual-mode device, comprising a dual-mode scheduling module, a protocol stack, a ZigBee protocol stack, a matching module and a communication module, wherein
   the dual-mode scheduling module is configured to uniformly schedule transmission events of the Bluetooth protocol stack and the ZigBee protocol stack;
   the matching module is configured to match with a Bluetooth host and a ZigBee target device;
   the communication module is configured to, after the matching module completes matching with the Bluetooth host and the ZigBee target device, conduct Bluetooth connection maintenance based on scheduling by the dual-mode scheduling module at a preset interval, and process information exchange with the ZigBee target device at each Bluetooth connection interval,
   wherein the dual-mode scheduling module controls the communication module to periodically exchange data with the Bluetooth host device during a Bluetooth low power consumption connection maintenance period, so as to flexibly schedule timing for receiving and sending the ZigBee data,
   wherein, after the communication module monitors a connection request of the ZigBee target device, the dual-mode scheduling module determines whether there is enough time to complete the ZigBee transmission before a next Bluetooth maintenance connection, and triggers the communication module to start the ZigBee transmission immediately when determining that there is enough time to complete the ZigBee transmission, and triggers the communication module to start the ZigBee transmission after the next Bluetooth maintenance connection when determining that there is no enough time to complete the ZigBee transmission.

* * * * *

UNITED STATES PATENT AND TRADEMARK OFFICE
CERTIFICATE OF CORRECTION

PATENT NO. : 9,860,684 B2
APPLICATION NO. : 15/089754
DATED : January 2, 2018
INVENTOR(S) : Haipeng Jin et al.

It is certified that error appears in the above-identified patent and that said Letters Patent is hereby corrected as shown below:

On the Title Page

Item (30), please correct the following error in the application number of the Foreign Application Priority Data:
Please change "2015 1 0996787" to --201510996787.6--.

Signed and Sealed this
Thirty-first Day of July, 2018

Andrei Iancu
*Director of the United States Patent and Trademark Office*